(12) United States Patent
Jeyapaul et al.

(10) Patent No.: US 11,346,773 B2
(45) Date of Patent: May 31, 2022

(54) FABRY-PEROT SPECTROMETER-BASED SMOKE DETECTOR

(71) Applicant: Kidde Technologies, Inc., Wilson, NC (US)

(72) Inventors: Elbert Jeyapaul, Karnataka (IN); Thambiraj Avudaiappan, Bengaluru (IN)

(73) Assignee: KIDDE TECHNOLOGIES, INC., Wilson, NC (US)

(*) Notice: Subject to any disclaimer, the term of this patent is extended or adjusted under 35 U.S.C. 154(b) by 0 days.

(21) Appl. No.: 16/910,332

(22) Filed: Jun. 24, 2020

(65) Prior Publication Data

US 2021/0333201 A1 Oct. 28, 2021

(30) Foreign Application Priority Data

Apr. 22, 2020 (IN) .............................. 202011017308

(51) Int. Cl.
*G01N 21/33* (2006.01)
*B64D 45/00* (2006.01)
*G08B 17/103* (2006.01)

(52) U.S. Cl.
CPC ............. *G01N 21/33* (2013.01); *B64D 45/00* (2013.01); *G08B 17/103* (2013.01); *B64D 2045/009* (2013.01); *G01N 2201/0636* (2013.01); *G01N 2201/0638* (2013.01); *G01N 2201/06113* (2013.01)

(58) Field of Classification Search
CPC ......... G01N 21/33; G01N 2201/06113; G01N 2201/0636; G01N 2201/0638; B64D 45/00; B64D 2045/009; G08B 17/103

USPC .................................................. 356/300–521
See application file for complete search history.

(56) References Cited

U.S. PATENT DOCUMENTS

| 4,369,404 A * | 1/1983 | Flygare .................. G01N 22/00 324/615 |
| 5,420,440 A * | 5/1995 | Ketler ................... G01N 21/534 250/573 |
| 5,550,373 A * | 8/1996 | Cole ......................... G01J 3/02 250/338.1 |
| 10,386,245 B2 | 8/2019 | Nayak et al. |
| 2006/0262324 A1* | 11/2006 | Hays ....................... G01S 17/89 356/519 |
| 2007/0145236 A1* | 6/2007 | Kiesel ....................... G01J 3/02 250/208.1 |
| 2008/0198027 A1 | 8/2008 | Bugge |

(Continued)

FOREIGN PATENT DOCUMENTS

| GB | 2286041 A | 8/1995 |
| WO | 9309422 A1 | 5/1993 |

(Continued)

OTHER PUBLICATIONS

Extended European Search Report for EP Application No. 21168567.2, dated Sep. 24, 2021, pp. 1-9.

*Primary Examiner* — Tri T Ton
(74) *Attorney, Agent, or Firm* — Cantor Colburn LLP

(57) ABSTRACT

A smoke detector includes a laser light source to provide incident light. The smoke detector also includes a Fabry-Perot etalon to transmit some incoming light, which is produced from the incident light, as transmitted light. Smoke particles in a cavity of the Fabry-Perot etalon affect an intensity of one or more wavelengths of the transmitted light.

4 Claims, 2 Drawing Sheets

(56) References Cited

U.S. PATENT DOCUMENTS

2017/0356842 A1 12/2017 Rao et al.
2019/0187038 A1 6/2019 Deliwala
2019/0277703 A1 9/2019 Valouch et al.

FOREIGN PATENT DOCUMENTS

WO 2016087450 A2 6/2016
WO 2019115596 A1 6/2019

* cited by examiner

FABRY-PEROT SPECTROMETER-BASED SMOKE DETECTOR

CROSS-REFERENCE TO RELATED APPLICATIONS

This application claims the benefit of IN Application No. 202011017308 filed Apr. 22, 2020, the disclosure of which is incorporated herein by reference in its entirety.

BACKGROUND

Exemplary embodiments pertain to the art of detection of a fire condition and, in particular, to a Fabry-Perot spectrometer-based smoke detector.

Smoke detection and fire suppression are important functions in many environments. In an aircraft, for example, smoke detection systems monitor lavatories and the cabin and cargo compartments. Depending on the type of fire, the detection of smoke can indicate a fire condition at its early stages (e.g., before temperature increase is sufficiently high to trigger a heat detection system) and, thus, can provide additional time to implement fire suppression techniques. Smoke is a collection of airborne particles and gases that are generated when a material undergoes combustion or pyrolysis.

BRIEF DESCRIPTION

In one embodiment, a smoke detector includes a laser light source to provide incident light. The smoke detector also includes a Fabry-Perot etalon to transmit some incoming light, which is produced from the incident light, as transmitted light. Smoke particles in a cavity of the Fabry-Perot etalon affect an intensity of one or more wavelengths of the transmitted light.

Additionally or alternatively, in this or other embodiments, the smoke detector also includes a slit source to provide diffracted light from the incident light.

Additionally or alternatively, in this or other embodiments, the smoke detector also includes a collimating lens to provide parallel beams of light as the incoming light from the diffracted light.

Additionally or alternatively, in this or other embodiments, the smoke detector also includes a prism to refract the transmitted light from the Fabry-Perot etalon and to produce a prism output.

Additionally or alternatively, in this or other embodiments, the smoke detector also includes a collimating lens and a photodetector array. The collimating lens aligns different wavelengths of the prism output at different portions of the photodetector array.

Additionally or alternatively, in this or other embodiments, the smoke detector also includes a controller to analyze a spectrometer output based on the photodetector array.

Additionally or alternatively, in this or other embodiments, the controller obtains a reference spectrometer output corresponding with a condition of no smoke or fire.

Additionally or alternatively, in this or other embodiments, the controller determines a change in intensity of one or more of the different wavelengths, corresponding with the one or more wavelengths of the transmitted light, based on a comparison of the spectrometer output with the reference spectrometer output.

Additionally or alternatively, in this or other embodiments, the controller determines a presence of smoke and a density of the smoke or a presence of fire based on the comparison.

Additionally or alternatively, in this or other embodiments, the laser light source provides the incident light as white light, and the smoke detector is disposed in an aircraft.

In another embodiment, a method of assembling a smoke detector includes configuring a laser light source to provide incident light, and disposing a Fabry-Perot etalon to transmit some incoming light, which is produced from the incident light, as transmitted light. Smoke particles in a cavity of the Fabry-Perot etalon affect an intensity of one or more wavelengths of the transmitted light.

Additionally or alternatively, in this or other embodiments, the method also includes arranging a slit source to provide diffracted light from the incident light.

Additionally or alternatively, in this or other embodiments, the method also includes positioning a collimating lens to provide parallel beams of light as the incoming light from the diffracted light.

Additionally or alternatively, in this or other embodiments, the method also includes positioning a prism to refract the transmitted light from the Fabry-Perot etalon and to produce a prism output.

Additionally or alternatively, in this or other embodiments, the method also includes arranging a collimating lens and a photodetector array such that the collimating lens aligns different wavelengths of the prism output at different portions of the photodetector array.

Additionally or alternatively, in this or other embodiments, the method also includes configuring a controller to analyze a spectrometer output based on the photodetector array.

Additionally or alternatively, in this or other embodiments, the configuring the controller includes the controller obtaining a reference spectrometer output corresponding with a condition of no smoke or fire.

Additionally or alternatively, in this or other embodiments, the configuring the controller includes the controller determining a change in intensity of one or more of the different wavelengths, corresponding with the one or more wavelengths of the transmitted light, based on a comparison of the spectrometer output with the reference spectrometer output.

Additionally or alternatively, in this or other embodiments, the configuring the controller includes the controller determining a presence of smoke and a density of the smoke or a presence of fire based on the comparison.

Additionally or alternatively, in this or other embodiments, the method also includes disposing the smoke detector in an aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, smoke detection is an important function. It can be especially important in certain environments. This is because, unlike running outside a house or building that is on fire, one cannot escape a fire in an airplane, for example. One prior approach to smoke detection includes detection of light refracted by smoke particles. When a photoelectric cell that detects the refracted light produces a threshold level of current, an alarm is triggered. Another prior approach involves the fact that more ions are produced in the presence of smoke. When current flow, which is established due to ion density, reaches a threshold value, an alarm is triggered. These and other prior approaches suffer from false alarms due to dust and aerosol particles that have the same effect as smoke particles in these detectors. Other issues may include poor sensitivity, slow response, ambient light interference, and performance degradation due to moisture.

Embodiments detailed herein relate to a Fabry-Perot spectrometer-based smoke detector. A Fabry-Perot interferometer involves two mirrors that partially reflect and transmit incident light. Based on the incident light wavelength being similar to the diameter of smoke particles, the presence of the smoke particles between the two mirrors causes Mie scattering of the light, which reduces the amplitude of the light transmitted out of the Fabry-Perot cavity. The Fabry-Perot cavity amplifies the transmitted light. That is, the Fabry-Perot optical cavity always amplifies the transmitted light, but the amplitude reduction resulting from Mie scattering only occurs in the presence of particles (e.g., smoke particles). The amplitude (i.e., intensity) of different wavelengths of the light may be affected differently by different particles. Thus, by using a spectrometer to analyze these relative intensities, smoke may be detected, the thickness (i.e., density) of the smoke may be detected, and a fire may also be detected based on the effect of temperature on the detected intensities.

Figure 1:
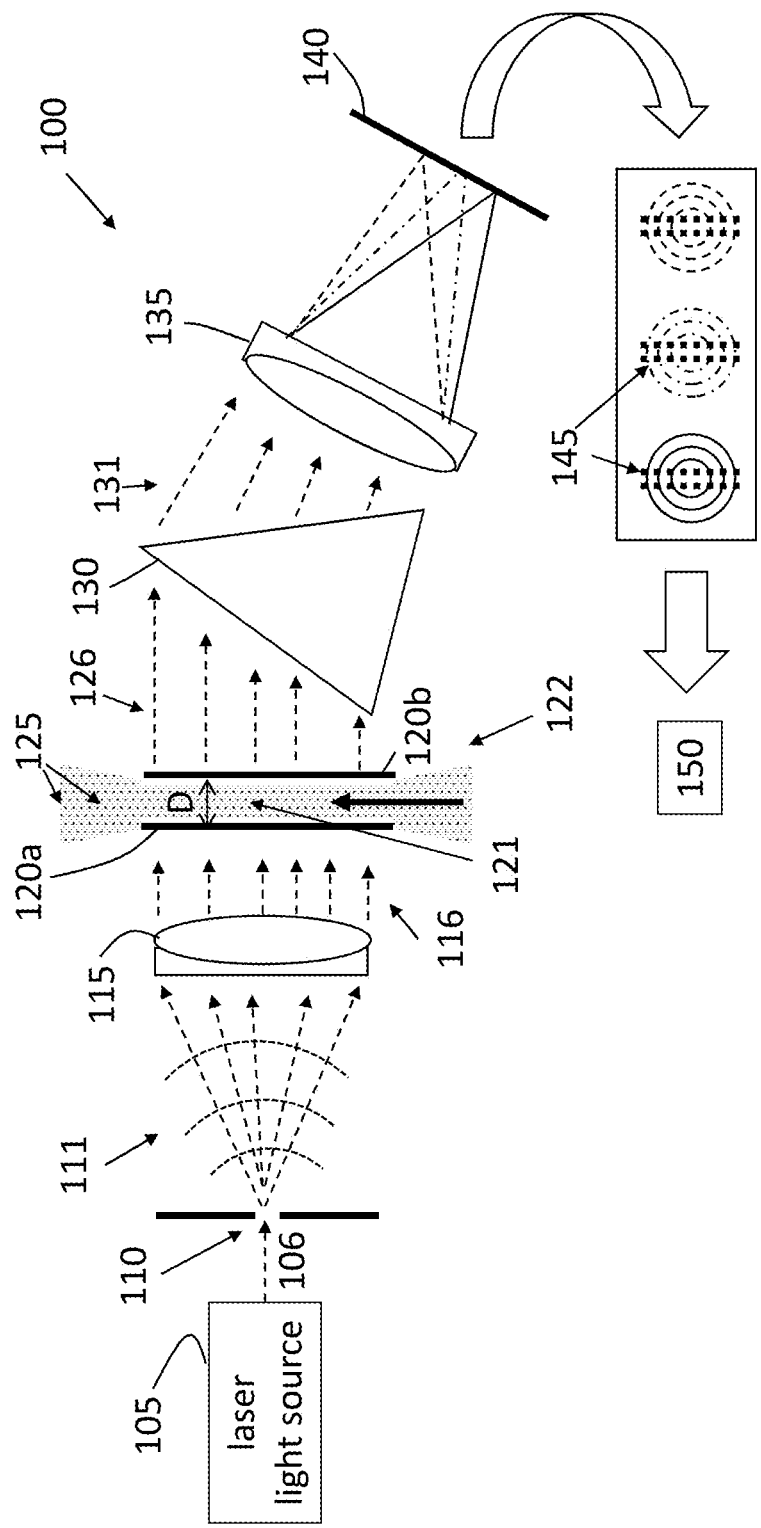
FIG. 1 is a block diagram of a Fabry-Perot spectrometer-based smoke detector according to one or more embodiments.

FIG. 1 is a block diagram of a Fabry-Perot spectrometer-based smoke detector 100 according to one or more embodiments. A laser light source 105 outputs incident light 106 used in the Fabry-Perot spectrometer-based smoke detector 100. The laser light source 105 may output white light, which is light with wavelengths in the range of about 380 nanometer (nm) to 780 nm. According to alternate embodiments, the laser light source 105 may output ultraviolet light, which has a lower wavelength, or light at a different wavelength range. A slit source 110 results in diffraction of the incident light 106. The diffracted light 111 from the slit source 110 reaches a collimating lens 115 that produces parallel beams 116.

A Fabry-Perot cavity 121 is defined by two reflective surfaces 120a and 120b (generally referred to as 120). The distance D between the reflective surfaces 120 is fixed and constant along the length of the Fabry-Perot cavity 121. Because the distance D is fixed rather than adjustable (i.e., the two reflective surfaces 120 are parallel), the interferometer is referred to as a Fabry-Perot etalon 122. The distance D may be about a few millimeters (mm). The reflective surfaces 120 partially reflect and transmit incoming light (i.e., the parallel beams 116). Repeated reflections and transmissions result in the superposition (i.e., interference) of light waves that exit the Fabry-Perot cavity 121 (i.e., transmitted light 126).

Smoke particles 125 are shown in the Fabry-Perot cavity 121, as well. The diameter d of the smoke particles 125 (on the range of less than 1 micrometers) is similar to the wavelength of white light, which may be the incident light 106 from the laser light source 105. This similarity means that smoke particles 125 in the Fabry-Perot cavity 121 will result in Mie scattering of the parallel beams 116 that enter the Fabry-Perot cavity 121 and the subsequent reflections between the two reflective surfaces 120 within the Fabry-Perot cavity 121. The wavelengths that are closest to the diameter of the smoke particles 125 (or whatever particles are in the Fabry-Perot cavity 121) are affected the most by the Mie scattering. The Mie scattering reduces the amplitude of the transmitted light 126 that emerges from the Fabry-Perot cavity 121. The Fabry-Perot cavity 121 acts as a resonator for reflections resulting from the smoke particles 125, meaning that different wavelengths of the reflected light are affected differently. Light emerging from the Fabry-Perot cavity 121 scatters in all directions. However, the intensity of scattered light will be highest along the direction of incident light to the particles. After multiple internal reflections in the cavity, some light exits the Fabry-Perot cavity 121. This is regarded as the transmitted light 126. The interference pattern, which results from a series of reflections within the Fabry-Perot cavity 121 prior to transmission, and intensity of the transmitted light 126 may be analyzed, as further discussed with reference to FIG. 2.

Transmission 126 from the Fabry-Perot cavity 121 is refracted by a prism 130. Thus, different wavelengths, which are bent at different angles through the prism 130, are separated in the prism output 131. A collimating lens 135 aligns the different wavelengths of the prism output 131 such that each wavelength is directed to a different area of the photodetector array 140. Three exemplary wavelengths are shown. These may correspond to the wavelengths of red, green, and blue light, for example. According to alternate embodiments, any number of wavelengths may be detected at the photodetector array 140.

A surface of the exemplary photodetector array 140 is shown and indicates an exemplary arrangement of photodetectors 145 that sense the intensity of respective waveform at different radial distances. Each photodetector 145 of the photodetector array 140 may be charge coupled device, a photodiode, or any other known light sensor. A controller 150 may obtain the outputs of the photodetectors 145 to perform analysis of the spectrometry result, as discussed with reference to FIG. 2. The controller 150 may include processing circuitry including memory and one or more processors.

Figure 2:
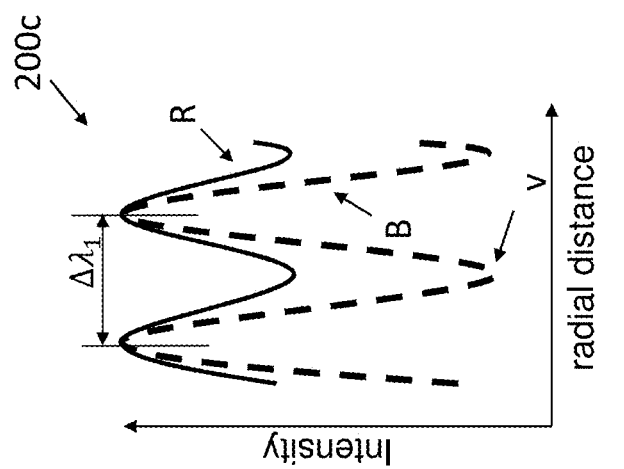
FIG. 2 illustrates spectroscopy results used for detection in a Fabry-Perot spectrometer-based smoke detector according to one or more embodiments.
Figure 2:
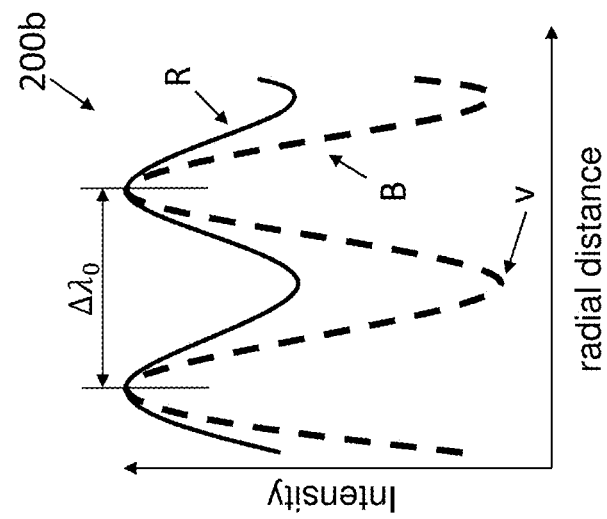
Figure 2:
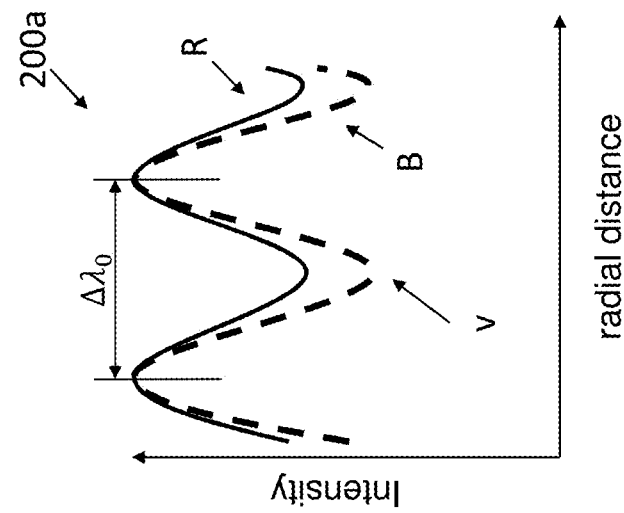

FIG. 2 illustrates spectrometer results 200 used for detection in a Fabry-Perot spectrometer-based smoke detector 100 according to one or more embodiments. FIG. 2 shows spectrometer results 200a, 200b, 200c (generally referred to as 200) for three different scenarios. Two exemplary wavelengths, red R and blue B, are shown for explanatory purposes. However, as previously noted, the photodetector array 140 may detect any number of wavelengths.

Spectrometer result 200a correspond with a nominal or reference scenario with no smoke particles 125 in the Fabry-Perot cavity 121 and no fire condition. The intensity of the two exemplary wavelengths, indicated as R and B, is shown along radial distance. The free spectral range $\Delta\lambda_o$, which is the spacing in wavelength between two successive maxima, is indicated. Because there are no smoke particles (or other particles) and, thus, no Mie scattering in the reference scenario, the spectrometer result 200a is the result of the Fabry-Perot cavity 121 acting as a resonator. The fact that the valley v is lower for the blue wavelength B than for the red wavelength R indicates that the transmitted light 126 has less of the blue wavelength B (i.e., more of the blue wavelength B is scattered than transmitted, as compared with the red wavelength R). This is an exemplary result shown for explanatory purposes. As another example, all wavelengths may be equally affected in the reference scenario.

Spectrometer result 200b correspond with a smoke condition (i.e., smoke particles 125 in the Fabry-Perot cavity 121). As previously noted, the smoke particles 125 result in Mie scattering of the light particles in the Fabry-Perot cavity 121, with different wavelengths being affected differently. A comparison indicates that the valley v for the blue wavelength B in the spectrometer result 200b (i.e., in the smoke condition) is lower as compared with the valley v in the spectrometer result 200a (i.e., in the reference conditions). That is, the Mie scattering resulting from the smoke particles 125 reduces the transmission of the blue wavelength B in the transmitted light 126, but the red wavelength R is largely unaffected by the smoke particles 125.

As the thickness of the smoke increases (i.e., the density of the smoke particles 125 increases), the valley v will be even lower for the blue wavelength B. This is because the increased concentration of smoke particles 125 will increase the Mie scattering. Consequently, not only the presence of smoke particles 125 but also the thickness of smoke may be detected by the Fabry-Perot spectrometer-based smoke detector 100 according to one or more embodiments. As the spectrometer result 200b indicates, the free spectral range $\Delta\lambda_0$ does not change from the reference condition.

Spectrometer result 200c correspond with a fire condition. As the temperature increases due to a fire, the optical density of the Fabry-Perot cavity 121 decreases, thereby decreasing the change in refractive index between the Fabry-Perot cavity 121 and the two reflective surfaces 120a, 120b. This changes the angle of light refracted in the Fabry-Perot cavity 121. The result is that the free spectral range $\Delta\lambda_1$ ($<\Delta\lambda_0$) decreases as compared with the reference or smoke scenarios. In addition, the valley v is similar to the smoke condition (i.e., spectrometer result 200b) because there will be smoke particles 125 in the Fabry-Perot cavity 121 during the fire.

The analysis that is used to identify the current condition facilitates distinguishing between smoke particles 125 and other particles (e.g., dust, gases), referred to as nuisance particles. Generally, the nuisance particles have a diameter greater than 1 micrometer (i.e., greater than the wavelength of white light). Thus, Mie scattering resulting from nuisance particles affects higher wavelengths of white light while Mie scattering resulting from smoke particles 125 affects lower wavelengths. When a combination of smoke particles 125 and nuisance particles is present in the Fabry-Perot cavity 121, both low and high wavelengths are affected by Mie scattering. Consequently, smoke particles 125, alone or in combination with nuisance particles, can be identified based on the Mie scattering and subsequent spectrometer result 200. For example, if the valley of the red wavelength R is reduced, that will be recognized as not being caused by smoke particles 125 but, instead, by nuisance particles. A look-up table of spectrometer results 200 for known conditions may be used by the controller 150 to identify the scenario corresponding with newly obtained spectrometer results 200, for example. A machine learning process may be employed by the controller 150 in an alternate exemplary embodiment.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A smoke detector comprising:
   a laser light source configured to provide incident light;
   a Fabry-Perot etalon configured to transmit some incoming light, which is produced from the incident light, as transmitted light, wherein smoke particles in a cavity of the Fabry-Perot etalon affect an intensity of one or more wavelengths of the transmitted light;
   a slit source configured to provide diffracted light from the incident light;
   a collimating lens configured to provide parallel beams of light as the incoming light from the diffracted light;
   a prism configured to refract the transmitted light from the Fabry-Perot etalon and to produce a prism output;
   a collimating lens and a photodetector array, wherein the collimating lens is configured to align different wavelengths of the prism output at different portions of the photodetector array; and
   a controller configured to analyze a spectrometer output based on the photodetector array, wherein the controller obtains a reference spectrometer output corresponding with a condition of no smoke or fire and the controller is configured to determine a change in intensity of one or more different wavelengths, corresponding with the one or more wavelengths of the transmitted light, based on a comparison of a spectrometer output with the reference spectrometer output and the controller is configured to determine a presence of smoke and a density of the smoke or a presence of fire based on the comparison.

2. The smoke detector according to claim 1, wherein the laser light source is configured to provide the incident light as white light, and the smoke detector is disposed in an aircraft.

3. A method of assembling a smoke detector, the method comprising:
configuring a laser light source to provide incident light;
disposing a Fabry-Perot etalon to transmit some incoming light, which is produced from the incident light, as transmitted light, wherein smoke particles in a cavity of the Fabry-Perot etalon affect an intensity of one or more wavelengths of the transmitted light;
obtaining a reference spectrometer output corresponding with a condition of no smoke or fire;
arranging a slit source to provide diffracted light from the incident light;
positioning a collimating lens to provide parallel beams of light as the incoming light from the diffracted light;
positioning a prism to refract the transmitted light from the Fabry-Perot etalon and to produce a prism output;
arranging a collimating lens and a photodetector array such that the collimating lens aligns different wavelengths of the prism output at different portions of the photodetector array; and
configuring a controller to analyze a spectrometer output based on the photodetector array, wherein the configuring the controller includes the controller obtaining a reference spectrometer output corresponding with a condition of no smoke or fire, the configuring the controller includes the controller determining a change in intensity of one or more different wavelengths, corresponding with the one or more wavelengths of the transmitted light, based on a comparison of a spectrometer output with the reference spectrometer output, and the controller includes the controller determining a presence of smoke and a density of the smoke or a presence of fire based on the comparison.

4. The method according to claim 3, further comprising disposing the smoke detector in an aircraft.

* * * * *